Oct. 28, 1924.
L. T. WILLIAMSON
AUTOMOBILE THEFT ALARM SWITCH
Filed June 9, 1923
1,513,664
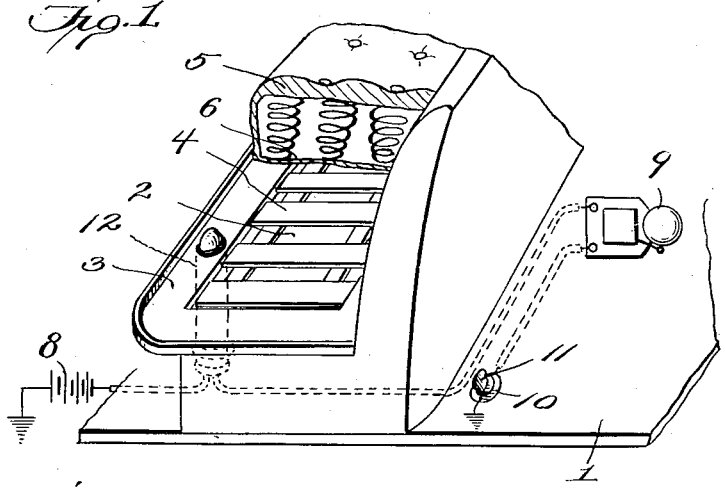
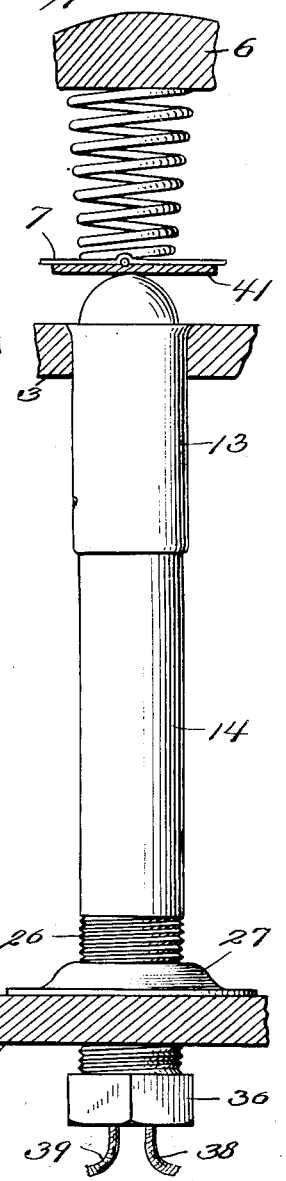
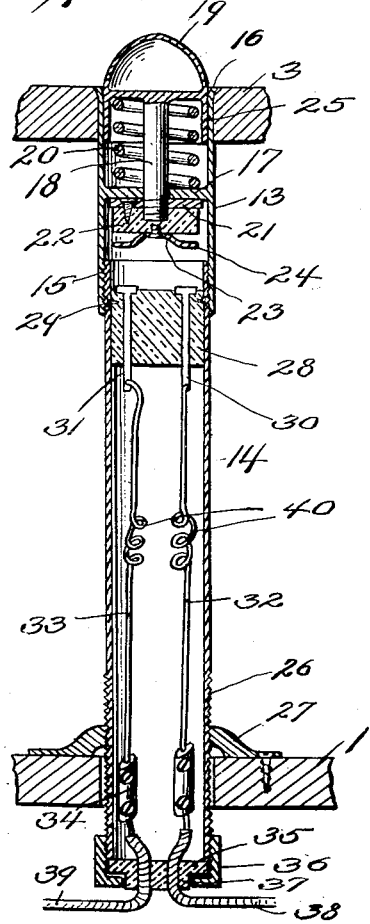
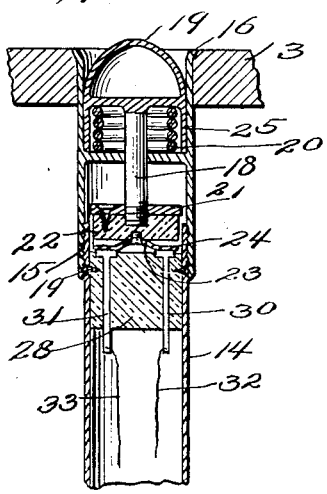
Inventor
Logan T. Williamson
By James L. Norris
Attorney Patented Oct. 28, 1924.

1,513,664

UNITED STATES PATENT OFFICE.

LOGAN T. WILLIAMSON, OF ATLANTA, GEORGIA.

AUTOMOBILE THEFT-ALARM SWITCH.

Application filed June 9, 1923. Serial No. 644,404.

*To all whom it may concern:*

Be it known that I, LOGAN T. WILLIAMSON, a citizen of the United States, residing at Atlanta, in the county of Fulton and State of Georgia, have invented new and useful Improvements in Automobile Theft-Alarm Switches, of which the following is a specification.

This invention relates to theft alarms for auto vehicles and particularly to an electrical signalling system which is arranged to be operated unawares by an unauthorized person, accompanying his attempt to drive the auto vehicle. The invention proposes the construction of a non-tamperable switch as an element in an electrical alarm system of the type referred to, and has for its object the provision of contact mechanism arranged within a casing which is adapted to be installed within the compartment beneath the driver's seat of the auto vehicle, and extending through both the top and bottom walls of said compartment so as to leave no wiring or other delicate mechanism exposed within said compartment, but only the casing, and that being made of such shape and substance as to resist the application of a demolishing tool.

Another object of the invention is to so construct the switch casing as to adapt it to seat compartments of different depths.

Another object of the invention is to provide the switch casing with a seat-engaged push button projecting above the seat compartment, and depressible by the weight of a person upon the driver's seat, into circuit closing relationship with cooperating contact mechanism within said casing.

Still another object of the invention relates to the provision of features by means of which the installation of the switch casing is easily accomplished.

Further objects of the invention concern themselves with novel features of the contact mechanism within the casing.

With the above and other objects in view, my invention consists in the improved automobile theft alarm switch illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:

Figure 1 is a perspective view of the driver's seat of an auto vehicle, parts being omitted to show the location of my improved switch, the theft alarm circuit being diagrammatically represented.

Figure 2 is a view in elevation of the switch casing, parts of the auto vehicle being shown in section.

Figure 3 is a longitudinal section through the switch, the same being shown with the circuit open.

Figure 4 is a similar view of the upper portion of the switch showing the parts in circuit-closed position.

Referring now in detail to the several figures, the numeral 1 represents the floor of an auto vehicle, which also forms the lower wall of the compartment 2 beneath the driver's seat. The upper wall of said seat compartment is usually formed of a rim 3 extending therearound, affording an opening giving access to the seat compartment which may be closed by a slatted lid 4, or by any other desired form of closure. The rim 3 affords support to the cushion 5, which is removable, and, in various makes of cars, provided with a closed bottom 6 as shown in Figure 1 or with an open bottom, having the springs held in place merely by a network of transverse wires as is indicated at 7 in Figure 2.

The electrical alarm system, an element of which is constituted by my invention, comprises a source of current which may be the battery 8, an alarm device, the electric bell 9, a lock switch 10 of any usual construction having a key 11 by means of which the circuit may be rendered inoperative at the will of the authorized driver, electrical conductors connecting the several parts in circuit, and a seat operated switch which, in general, constitutes the subject of the present invention.

Said switch is theft deterrent in character, and to this end comprises a cylindrical casing 12 in which the electrical mechanism of the switch is completely enclosed and which opposes a smooth cylindrical surface to any tool which a potential thief might use in his attempt to demolish the switch mechanism. The casing 12 is designed to be positioned within the seat compartment bridging the depth thereof, and being secured in suitably formed aligned apertures in the upper and lower walls of said compartment.

The casing 12 comprises an upper part 13 and a lower part 14 which is preferably made of slightly smaller diameter than the part 13 and telescopes within the lower open end of the latter, preferably threadedly engaging the inner wall of the same as shown at 15. The upper end of the part 13 of the casing is preferably slightly flared as shown at 16 and snugly fits a similarly flared aperture in the rim or upper wall 3. While, in the exemplified form of the invention no other securing means is provided for the upper part 13, it is obvious that screws or other common means might be used in fastening the part 13 securely to the upper wall 3.

Within the part 13 intermediate its ends is a fixed partition 17, centrally apertured. A sliding stem 18 passes through this aperture and carries at its upper end a push button 19 having a convex, or bullet shaped upper surface and being of such diameter as to snugly but slidably fit within the bore of the upper end of the casing part 13. Beneath the push button 19 and above the partition 17 is a spring 20, preferably of spiral form, which maintain the push button 19 and stem 18 in elevated position in which said push button projects above the upper wall 3 of the seat compartment to be engaged by the bottom 6 of the cushion 5. The spring 20 is of such strength as to resist the weight of the cushion so that the latter will not of itself cause depression of the push button 19. That end of the stem 18 which lies below the partition 17 is threaded, for the reception of a washer 21, preferably of metal to which is fixed, in any suitable manner a fiber disk 22. A switch contact 23, having a resilient flange 24 is fixed to the fiber disk 22, but normally out of contact with all electrically conductive parts of the switch. The washer 21 not only acts as a support for the fiber disk 22 but by co-acting with the lower face of the partition 17, functions as a stop for limiting the extent of projection of the push button 19 above the upper wall of the seat compartment. Said push button is formed, within the bore of the casing part 13 with a depending flange 25 which co-acts with the upper face of the partition 17 limiting the extent of travel of said push button in a downward direction and therefore determining the lower limit of travel of the resilient flange 24.

The switch casing 12 is designed to be equally adaptable for installation within seat compartments of different depth, to which end the lower part 14 is formed with an extensive threaded portion 26 adjacent its lower end. Said lower end passes through an aperture in the lower wall 1 of the seat compartment, and threadedly engages a socket member 27 which is screwed or otherwise fastened to the inner face of the lower wall 1 in alignment with the aperture in said wall. In placing the casing 12 in position the lower part 14 is screwed into the socket 27 until the upper end of said lower part occupies a position below the space to be occupied by the upper part 13. The latter is next positioned in the aperture in the upper wall of the seat compartment and the lower part 14 is then unscrewed from the socket 27 until the upper end thereof enters the upper part 13 and travels upwardly to a position into which is determined by the extent of the threaded portion. For deep seat compartments the lower portion of the part 14 will be screwed quite a distance out of the socket 27, while for shallow seat compartments it will be necessary to screw it out but a slight distance. Within the lower part 14 of the casing 12 and adjacent the upper end thereof a fiber block 28 is secured by any suitable means such as the screws 29. Said screws are preferably so positioned that when the two parts of the casing are normally assembled, the heads of said screws will be shielded beneath the overhanging wall of the upper part 13 as shown in Figures 3 and 4. The block 28 carries, in insulated relation, the contact posts 30 and 31 which form the opposite poles of the circuit including the battery 8 and the alarm device 9. The position of the block 28 is such that when the push button is depressed, as shown in Figure 4, the resilient flange 24 will make contact with both of the posts 30 and 31 completing the electrical circuit and sounding the alarm. The limit imposed by the extent of the threaded portion 15 to the entrance of the lower part 14 within the upper part 13 of the casing, when assembled, assures that, regardless of the depth of the seat compartment the fiber block always occupies the same relative position with respect to the flange 24, when depressed, ensuring closure of the circuit at each depression of the push button. The lower ends of the posts 30 and 31 are connected in any suitable manner to the wires 32 and 33 which are preferably loosely looped within the lower casing part 14 and have their lower ends clampably arranged within the connectors 34 which are of usual and well known construction. The wires 32 and 33 are preferably heavily insulated.

The lower threaded end of the casing 14 projects below the floor of the auto vehicle and is preferably closed by a dust cap consisting of a plug 35 of insulating material having a base sufficiently large to rest upon the end of the part 14 and being held in place by a ring nut 36 screwed upon the threaded end portion of said casing part and clampably holding the plug 35 in position. Said plug may be formed with a portion 37 of reduced diameter which extends through the opening in said ring nut, and is provided with a pair of apertures to permit the introduction of the circuit conductors 38 and 39 within the casing. The ends of said conductors are clampably secured within the connectors 34. At the time of installing the automobile theft switch, or at any subsequent time, should it be desired to connect or disconnect the conductors 38 and 39, to or from the connectors, it is accomplished by unscrewing the ring nut and pulling the plug longitudinally away from the casing portion 14, the slack part of the wires 32 and 33 which is represented by the reference numeral 40 being sufficient to permit the withdrawal of said connectors to a position without the casing part 14, in which a screwdriver may be conveniently applied to the screws forming part of said connectors.

In the operation of my novel automobile theft switch, the authorized driver of the vehicle leaves his seat and places the lock switch 10 in closed position by means of the key 11, which latter he then removes. When he returns to drive the car he reinserts the key and opens the lock switch so that when he occupies the driver's seat the alarm will not be sounded. Should a thief attempt to drive away the car during his absence, pressure of the thief's weight upon the cushion 5 will depress the push button 19, closing the circuit through the posts 30 and 31 by means of the resilient metallic flange 24. This will sound the alarm. Should the thief attempt to investigate the nature or source of the alarm, he may raise the cushion 5 whereupon he will be confronted by the bullet shaped push button 19 the sides of which present a smooth curved surface that will defy any attempt that he may make to get a grip upon the push button with the pliers. If he tries to pry the upper part of the casing out of the upper wall of the seat compartment by forcing a screwdriver under the edge of the flared portion 16, the attempt will be thwarted by the threaded connection between the two casing parts. Should he continue his investigation by raising the slatted cover 4 and getting into the seat compartment he will find merely the smooth tubular casing 12 extending from the top to the bottom of said seat compartment and exposing no wires or other parts which he may damage or remove and so throw the alarm out of commission. The casing 12 is preferably made of substantial material such as steel which is sufficient to defy any of the attempts which he is likely to make to break into the casing or to tear it from its support. It is taken for granted that by the time the thief has investigated the matter thus far, he will have spent so much time and created sufficient suspicion by his actions, particularly after the initial sounding of the alarm, that he will, in the interest of his personal liberty, abandon his attempt to steal the auto vehicle.

While I have shown my invention, in Figure 1, as being located underneath the front rim member of the seat compartment it is obvious that this position is only one of many in which the switch may be placed and still be operated by pressure of a person's weight upon the cushion. In the event that the bottom of the seat cushion is formed merely of intersecting wires such as is indicated in Figure 2, it may be necessary to affix a smooth rigid plate 41, of any suitable material, to said wires, so located as to be in registry with the head of the push button 19 when the cushion is in place.

While I have above described what I have found to be a very practical embodiment of my invention, it is nevertheless to be understood that the automobile theft alarm switch may also be exemplified in numerous other alternative constructions and I accordingly reserve the right of adopting all such legitimate changes as may be fairly embodied within the spirit and scope of the invention as claimed.

Having described my invention what I claim as new and desire to secure by Letters Patent, is:—

1. A switch for automobile theft alarms, adapted to bridge spaces of various size between parallel spaced walls, comprising a two-part tubular casing, one part being invariably secured to one wall, and having a socket at the lower end, the other part being exteriorly threaded adjacent its lower end for a distance at least equal to the range of differences in the width of spaces which the device is designed to bridge, said part being engageable with a threaded bore in the other wall, and advanceable by screwing, into telescopic relation with the socket of the first part, and cooperating switch contacts one retained in each casing part.

2. A switch for automobile theft alarms, adapted to bridge spaces of various size between parallel spaced walls, comprising a two-part tubular casing, one part being invariably secured to one wall, flush with the upper face thereof, and having a socket at the lower end, the other part being exteriorly threaded adjacent its lower end for a distance at least equal to the range of differences in the width of spaces which the device is designed to bridge, said part being engageable with a threaded bore in the other wall, and advanceable by screwing, into telescopic relation with the socket of the first part, cooperating switch contacts one retained in each casing part, and a push button carried by the first casing part for operating said switch, said push button being formed with a convex portion, the latter only extending beyond the first part.

3. A switch for automobile theft alarms adapted to bridge spaces of various size between parallel spaced walls, comprising a two-part tubular casing, one part being invariably secured to one wall, and having a socket at the lower end, the other part being externally threaded adjacent its lower end for a distance at least equal to the range of differences in the width of spaces which the device is designed to bridge, said first part being engageable with a threaded bore in the other wall, and advanceable by screwing into telescopic relation with the socket in the first part, means for limiting the inward telescopic movement of said parts, and cooperating switch contacts one retained in each casing part.

4. A switch for automobile theft alarms adapted to bridge spaces of various size between parallel spaced walls, comprising a two-part tubular casing, one part being invariably secured to one wall flush with the upper face thereof, and having a socket at the lower end, the other part being exteriorly threaded adjacent its lower end for a distance at least equal to the range of differences in the width of spaces which the device is designed to bridge, said part being engageable with a threaded bore in the other wall and advanceable by screwing into telescopic relation with the socket of the first part, cooperating switch contacts one retained in each casing part, and a push button carried by the first casing part and filling the end of the tubular bore therein, for operating said switch, said push button being formed with a convex portion, the latter only extending beyond the first casing part.

In testimony whereof I have hereunto set my hand.

LOGAN T. WILLIAMSON.